United States Patent
Wu et al.

(10) Patent No.: US 12,411,862 B2
(45) Date of Patent: Sep. 9, 2025

(54) SYSTEMS AND METHODS TO SEARCH FOR DIGITAL TWINS

(71) Applicant: ORANGE, Issy-les-Moulineaux (FR)

(72) Inventors: Si Wu, Beijing (CN); Xi Wang, Beijing (CN); Chuantao Yin, Beijing (CN)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/716,222

(22) PCT Filed: Nov. 14, 2022

(86) PCT No.: PCT/IB2022/000672
§ 371 (c)(1),
(2) Date: Jun. 4, 2024

(87) PCT Pub. No.: WO2023/105282
PCT Pub. Date: Jun. 15, 2023

(65) Prior Publication Data
US 2025/0013654 A1    Jan. 9, 2025

(30) Foreign Application Priority Data
Dec. 9, 2021 (WO) ................. PCT/CN2021/136819

(51) Int. Cl.
*G06F 16/24*    (2019.01)
*G06F 16/245*    (2019.01)
(Continued)

(52) U.S. Cl.
CPC .......... *G06F 16/248* (2019.01); *G06F 16/245* (2019.01); *G06N 3/08* (2013.01)

(58) Field of Classification Search
CPC ...... G06F 16/248; G06F 16/245; G06F 40/30; G06F 16/334; G06N 3/08; G06N 3/042; G06N 3/0455; G06N 3/091
(Continued)

(56) References Cited

U.S. PATENT DOCUMENTS 9,037,464 B1    5/2015 Mikolov et al.
10,891,673 B1 *    1/2021 Sawaf ................. G06F 16/3344
(Continued)

OTHER PUBLICATIONS

International Search Report dated Feb. 28, 2023 for corresponding International Application No. PCT/IB2022/000672, filed Nov. 14, 2022.
(Continued)

*Primary Examiner* — Hicham Skhoun
(74) *Attorney, Agent, or Firm* — David D. Brush; Westman, Champlin & Koehler, P.A.

(57) ABSTRACT

To search for digital twins (avatars) on a computerized platform, a semantic embedding is made of the search query and this is compared with respective semantic embeddings generated for digital twins on the computerized platform, to determine a first set digital twins whose semantic embeddings are similar to that of the search query. A trained graph neural network generates respective graph embeddings of feature data of the first set of digital twins, and these graph embeddings are compared with graph embeddings that the trained graph neural network generates for other digital twins on the platform, to determine a second set of digital twins whose graph embeddings are similar to graph embeddings of the first set of digital twins. The search results returned in response to the search query may include at least one digital twin in the second set of digital twins.

10 Claims, 2 Drawing Sheets

(51) Int. Cl.
*G06F 16/248* (2019.01)
*G06N 3/08* (2023.01)

(58) Field of Classification Search
USPC .......................................................... 707/722
See application file for complete search history.

(56) References Cited

U.S. PATENT DOCUMENTS

| | | | | |
|---|---|---|---|---|
| 11,016,997 | B1* | 5/2021 | Huang | G06F 16/285 |
| 11,709,885 | B2* | 7/2023 | Collomosse | G06N 3/045 |
| | | | | 382/305 |
| 11,734,339 | B2* | 8/2023 | Kale | G06F 18/21 |
| | | | | 707/722 |
| 11,809,822 | B2* | 11/2023 | Lin | G06F 40/216 |
| 2009/0315916 | A1* | 12/2009 | Husemann | G06Q 30/06 |
| | | | | 715/850 |
| 2019/0080234 | A1* | 3/2019 | da Silveira Kuhn | G06F 16/285 |
| 2020/0380027 | A1* | 12/2020 | Aggarwal | G06F 16/538 |
| 2021/0271707 | A1 | 9/2021 | Lin et al. | |
| 2022/0092108 | A1* | 3/2022 | Collomosse | G06F 16/5838 |
| 2023/0133522 | A1* | 5/2023 | Zhao | G06F 16/3349 |
| | | | | 707/769 |
| 2023/0244706 | A1* | 8/2023 | Perez | G06F 40/284 |
| | | | | 715/254 |
| 2023/0325991 | A1* | 10/2023 | Lin | G06T 7/194 |
| 2023/0325996 | A1* | 10/2023 | Zhang | G06V 10/255 |
| 2024/0394236 | A1* | 11/2024 | Misiewicz | G06N 20/00 |

OTHER PUBLICATIONS

Written Opinion of the International Searching Authority dated Feb. 28, 2023 for corresponding International Application No. PCT/IB2022/000672, filed Nov. 14, 2022.
English Translation of the International Search Report and Written Opinion of the International Searching Authority dated May 18, 2022 for corresponding International Application No. PCT/CN2021/136819 filed Dec. 9, 2021.
Jason Zhu et al., "TextGNN: Improving Text Encoder via Graph Neural Network in Sponsored Search," Arxiv.org, dated Jan. 16, 2021, Cornell University Library, Ithaca, NY, USA.
Sylvie Derrien et al., "Thing in, a research platform for the Web of Things," 2019 IEEE 27th International Symposium on Modeling, Analysis, and Simulation of Computer and Telecommunication Systems (MASCOTS), IEEE, dated Oct. 21, 2019, pp. 431-432.
William L Hamilton et al., "Inductive Representation Learning on Large Graphs," Arxiv.org, dated Jun. 7, 2017, Cornell University Library, Ithaca, NY, USA.
Nils Reimers et al., "Sentence-BERT: Sentence Embeddings using Siamese BERT-Networks," Arxiv.org, dated Aug. 27, 2019, Cornell University Library, Ithaca, NY, USA.
Kiros et al., "Skip-Thought Vectors,' Advances in Neural Information Processing Systems 28," 2015, pp. 3294-3302, ed. C. Cortes 5 et al.
Conneau et al., "Supervised Learning of Universal Sentence Representations from Natural Language Inference Data", Proceedings of the 2017 Conference on Empirical Methods in natural Language processing, pp. 670-680.
Cer et al., "Universal Sentence Encoder", arXiv:1803:11175.
Jacob Devlin et al., "BERT: Pre-training of Deep Bidirectional Transformers for Language Understanding".

* cited by examiner

SYSTEMS AND METHODS TO SEARCH FOR DIGITAL TWINS

CROSS-REFERENCE TO RELATED APPLICATIONS

This Application is a Section 371 National Stage Application of International Application No. PCT/IB2022/000672, filed Nov. 14, 2022, and published as WO 2023/105282 A1 on Jun. 15, 2023, in English, which claims priority to Chinese Patent Application No. PCT/CN2021/136819, filed Dec. 9, 2021, the contents of which are hereby incorporated by reference in their entireties.

FIELD OF THE INVENTION

The present invention relates to digital-twin-oriented search and/or recommendation systems, and to computer-implemented methods, that make use of graph neural networks.

TECHNICAL BACKGROUND

As technology develops, increasing numbers and types of real-world objects and environments are being represented in digital form on computerized platforms, as so-called "digital twins" (also called avatars). A digital twin is a virtual model designed to accurately reflect a physical object. For example, the digital twin Car_1 can park in the digital twin Car Park_A, or the digital twin Room_1 may be in the digital twin Building_B. More formally, digital twins are instances created based on ontology classes which are the definitions of an ontology. A huge number of digital twins have been created on digital twin platforms, notably to represent Internet-of-Things (IoT) objects in the real world.

For example, a digital representation may be created of a manufacturing facility, or an office, and this representation of the facility/office may include digital twins representing different rooms in the facility/office, and different machines and objects within the rooms. The digital representation of the facility/office may include data regarding the specifications and current status of the machines and objects, and may provide access to data generated by the machines, and may provide management capabilities allowing remote control of the machines/objects.

Computerized platforms that maintain a digital representation of real-world objects (devices, environments) have also been developed to facilitate the administering, discovering and exploiting of IoT devices. As an example, there can be mentioned the "Thing in the future" platform (hereafter Thing'in) developed and maintained by Orange.

"Thing'in" platform establishes and maintains a graph of things which, like a social network providing similar functionality for people, is composed of physical things and entities (the nodes) and logs the relationships (the links) between them. Digital twins on this platform are digital representations of things. A core aspect of the platform is the indexation of real-world devices and objects, along with their descriptions, according to a defined ontology. "Thing'in" platform maintains a structural and semantic definition not only of the IoT devices (connected objects) themselves and their relationships, but also of the environments in which the connected objects are located. The environment may include objects that may not, themselves, be IoT devices but which are described by ontologies included in the "Thing'In" dataset (e.g., streetlight, fountain, car park).

The "Thing'in" platform is equipped to support expansion by addition of new objects/devices. "Thing'in" platform is a multi-interface platform which engineers and IoT app developers can connect to and interact with at its front end, and data providers can do so at its back end. Thus, the number of objects logged on the platform evolves over time. The platform has respective APIs that allow data providers to insert objects, and that allow engineers and IoT app developers to connect to and interact with logged objects.

Often there is a need to perform a search for a digital twin on a computerized platform such as "Thing'in" platform. For instance, to modify or delete some digital twins, a retrieval system is indispensable for developers to find the digital twin quickly and efficiently. As another example, an engineer or application developer may wish to find and exploit existing IoT devices, and/or the data they produce, for instance in order to be able to implement a new technical system, and so may need to find suitable digital twins on a computerized twin platform whereon IoT entities are represented by digital twins. As yet another example, an engineer managing a large manufacturing facility via use of a computerized platform may wish to modify the operating parameters of certain machines that are represented by digital twins on the platform.

Although some platforms exist which enable users to discover IoT devices and/or to explore environments in which IoT devices and/or other digital twins are deployed, searches for digital twins/avatars using known methods and systems may fail to produce adequate results, notably in terms of the number, variety or pertinency of results produced in response to the user query.

Some search/recommendation systems use a collaborative filtering process to identify the results to return to a user query that seeks a particular kind of digital twin on a computerized platform. The collaborative filtering process determines other users having behaviour or characteristics that are similar to those of the current user generating the user query, and returns results that have been of interest to the "similar" users. However, collaborative filtering processes tend to fail in cases where there is little user data, for example in the event that the person generating a query is a new user for whom little data is available regarding their behaviour and/or characteristics (i.e., a user having a sparse search history).

As another example, some search/recommendation systems identify results to return to the user query by searching for items having semantic similarity to expressions included in the user query. However, searching by semantic similarity may provide results in insufficient number or results that are not pertinent (do not match the user's request), especially in cases where the user is a non-expert unfamiliar with the terminology and/or formatting used in the relevant dataset.

Another approach would be to enrich search results by using a knowledge graph to look up digital twins which have an explicit relation (link) between one another as defined in the knowledge graph. However, such an approach cannot be generalized to find unlinked nodes that may be relevant.

Document "TextGNN: Improving Text Encoder via graph Neural network in Sponsored Search", Jason Zhu et al, arXiv:2101.06323v1, describes a computer-implemented architecture, named TextGNN, which allows to combine operations performed to encode text with operations performed by a graph neural network. However, such architecture remains deficient in achieving a satisfactory number, variety and/or relevance of search results.

Accordingly, a need exists for improved digital-twin-oriented search and/or recommendation systems and methods to improve the probability of obtaining a satisfactory number, variety and/or relevance of search results.

The present invention has been made in the light of the above issues.

SUMMARY OF THE INVENTION

The present invention provides a computer-implemented method of searching for digital twins in a target dataset on a computerized platform, said target dataset comprising a graph in which the digital twins are the nodes and the relations between them are the edges, the method comprising:

receiving a search query comprising one or more input search terms;

generating a semantic embedding of the search query;

comparing the semantic embedding of the search query with respective semantic embeddings generated in respect of each of a plurality of digital twins on said computerized platform, to determine a first set of one or more digital twins having semantic embeddings similar to the semantic embedding of the search query;

inputting, into a trained graph neural network, feature data of the first set of one or more digital twins and data from said graph, to generate a respective graph embedding in respect of the or each of said first set of digital twins, said trained graph neural network comprising a graph neural network architecture trained using training data from said graph;

comparing the graph embedding(s) generated by the trained graph neural network in respect of the first set of digital twins with graph embeddings generated by said trained graph neural network in respect of other digital twins on said computerized platform, to determine a second set of one or more digital twins whose graph embeddings are similar to the graph embeddings of said first set of digital twins; and outputting search results comprising information identifying at least one digital twin of said second set of digital twins.

Embodiments of search/recommendation methods according to the invention can generate search results which include not just digital twins that have semantic similarity to a search query but also digital twins that are related by twins' relationships (indirect as well as direct) in the graph of digital twins. Accordingly, such methods enable a set of numerous, varied and relevant search results to be provided in response to a user query even in a case where little data is available regarding user behavior and characteristics, thus overcoming the above-described disadvantage of search/recommendation methods based on collaborative filtering. Similarly, such methods enable a set of numerous, varied and relevant search results to be provided in response to a user query even in a case where the expressions used in the user query are badly matched to the terminology used in the targeted dataset (e.g., because of a user's lack of experience in regard to the relevant dataset), thus overcoming the above-described disadvantage of search/recommendation methods based on semantic similarity.

In the above-mentioned search/recommendation method according to the invention, the digital twins in the target dataset constitute nodes of a graph and the relationships between the digital twins in said target dataset constitute edges of said graph. The trained graph neural network comprises a neural network architecture that is trained using training data from said graph. In this way, the graph embeddings generated by the trained graph neural network in respect of digital twins that have rich relationships in the graph of digital twins are close together in the output space.

In the above-mentioned search/recommendation methods according to the invention, the comparing of the semantic embedding of the search query with respective semantic embeddings generated in respect of each of a plurality of digital twins on the computerized platform may comprise comparing of the semantic embedding of the search query with respective semantic embeddings of textual information characterizing the digital twins, for instance their name, description, the name of their class (ontology), comments associated with the digital twin, and so on. Typically, digital platforms assign, to digital twins, names which are indicative of the class of real-world object in question. Accordingly, use of semantic embeddings of the names of digital twins has a good probability of identifying digital twins which are relevant to the search query.

In certain preferred embodiments of the invention, the semantic embedding of the search query and the semantic embeddings for the digital twins are generated using an SBERT network. SBERT networks have excellent performance in terms of assuring that the semantic embeddings output in respect of input word-groups that express semantically-similar notions are close together in the output space and that the semantic embeddings output in respect of input word-groups that express semantically-different notions are far apart from one another in the output space.

The graph neural network architecture may be a GraphSAGE neural network architecture, which provides high performance.

In the above-mentioned search/recommendation methods according to the invention, the graph neural network architecture may be a GraphSAGE neural network architecture configured to process input feature sets comprising semantic embeddings generated for said digital twins as well as data properties of the digital twins. Such extension of the feature sets processed by the GraphSAGE neural network architecture, to include the semantic embeddings, has been found to yield particularly good performance in terms of predicting links between digital twins. The semantic embeddings may be semantic embeddings of the names, classes, description, etc. of the digital twins, for example embeddings generated by an SBERT network.

In the above-mentioned search/recommendation methods according to the invention, a respective rank score may be assigned to digital twins in said first and second sets of digital twins and the digital twins may be selected and/or ordered for output based on their rank scores. In this way, results that are liable to be more highly relevant to, or useful for, the user may be presented first, enabling time savings to be obtained in the event that the user needs to interact with the digital twins.

Search/recommendation methods according to the invention may be configured to search on an Internet-of-Things platform for digital twins corresponding to Internet-of-Things entities having respective assigned classes. The methods may further comprise:

detecting if plural digital twins included in the first and/or second sets of digital twins correspond to Internet-of-Things entities having the same assigned classes and, upon detecting such plural digital twins, discarding at least one of said plural digital twins from the search results.

In the case where the first and/or second sets of digital twins include multiple digital twins having the same class (e.g., representing IoT devices of the same type), it may be appropriate to discard all but one of these digital twins so as to reduce redundancy in the search results.

The present invention still further provides a search/recommendation system configured to search for digital twins in a target dataset on a computerized platform, said target dataset comprising a graph in which the digital twins are the nodes and the relations between them are the edges, said system comprising a computing apparatus programmed to execute instructions to perform any of the above-described search/recommendation methods.

The present invention still further provides a computer program comprising instructions which, when the program is executed by a processing unit of a computing apparatus, cause said processing unit to perform any of the above-described search/recommendation methods.

The present invention yet further provides a computer-readable medium comprising instructions which, when executed by a processor of a computing apparatus, cause the processor to perform to perform any of the above-described search/recommendation methods.

The techniques of the present invention may be applied to search for digital twins on computerized platforms. As an example, such methods and systems may be used to search for digital twins on the Thing'in platform.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DETAILED DESCRIPTION OF EXAMPLE EMBODIMENTS

Figure 1:
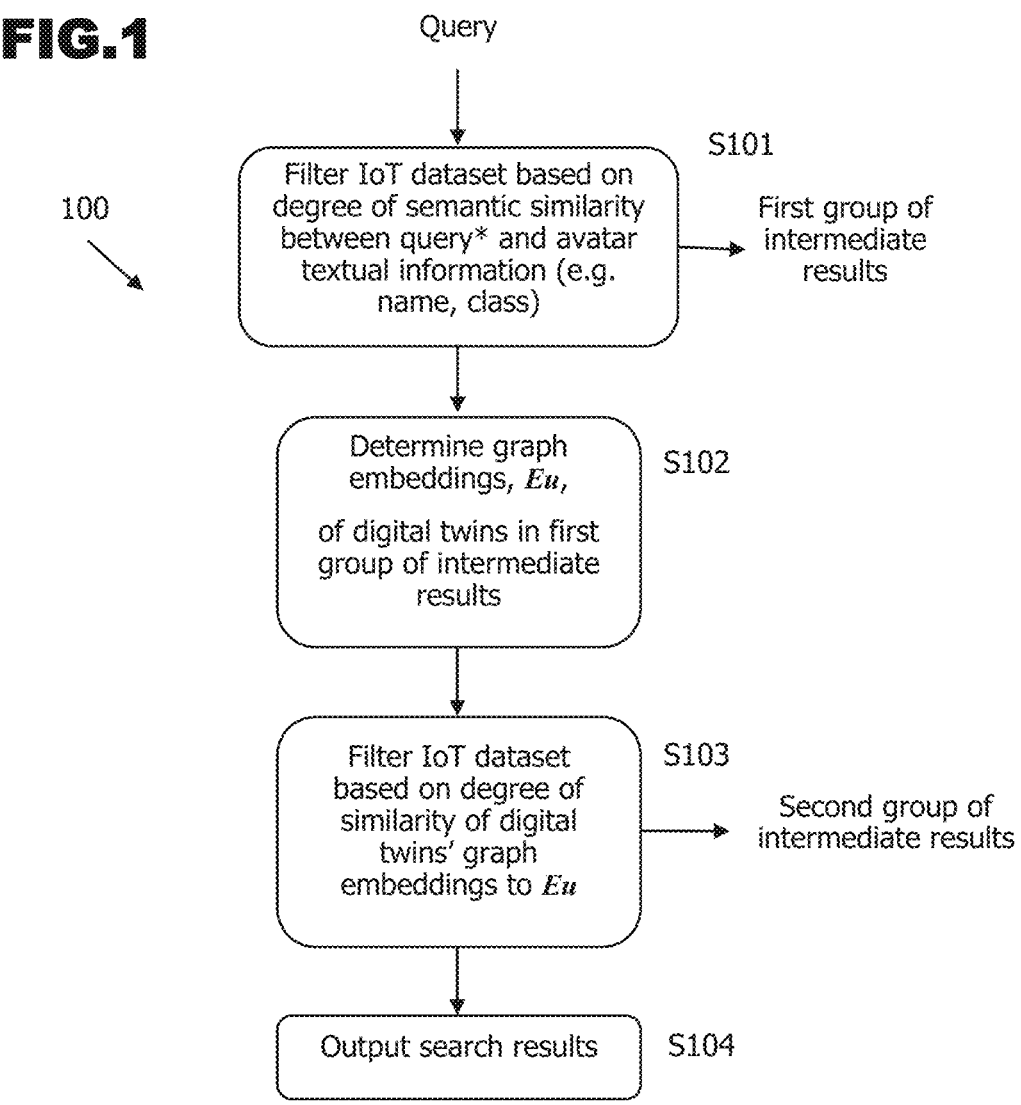
FIG. 1 is a flow diagram illustrating a computer-implemented search method according to a first embodiment of the invention, employing a trained graph neural network.

The present invention provides embodiments of digital-twin-oriented search and/or recommendation systems, and corresponding computer-implemented methods, that enhance relevance, number and/or variety of retrieved digital twins by making use of graph neural networks (GNNs).

Embodiments of the present invention use trained GNNs to generate a digital representation (graph embedding) for each digital twin of a searched dataset. The dataset can be considered to embody a graph in which digital twins are the nodes and the relations between them are the edges. The embedding that the GNN generates in respect of a digital twin in the dataset incorporates local information regarding the digital twin's "neighbours" within the graph. An inductive training method may be used to train the GNN, which can then be generalized even to new graphs. In a variant, an enhanced feature set, including complementary information regarding the digital twin, is used as input to the GNN and thereby an improvement is obtained in performance in predicting links to "similar" digital twins. Retrieval results obtained based on semantics may be integrated with results obtained using the graph neural network to produce a richer set of search results.

A computer-implemented search method 100 according to a first embodiment of the invention will now be described with reference to FIG. 1. In the examples discussed below in relation to FIGS. 1 to 4, the digital twins are IoT entities in a dataset such as the whole or a subset of a database of an IoT platform. However, it is to be understood that the invention is applicable more generally to systems and methods that search for digital twins irrespective of whether the digital twins represent IoT entities.

First, an outline will be given of the main steps in the search/recommendation method 100 according to the first embodiment, then each step will be discussed in greater detail. In a step S101, a first group of digital twins in the searched dataset is identified based on the degree of semantic similarity between their semantic information, for example their respective names, and the search query (typically using a pre-processed version, Query*, of the search query). The identified first group of digital twins constitutes a first set of intermediate results. Typically the first group of digital twins comprises a plurality of digital twins but, in principle, the first group could include just a single digital twin.

In a step S102, a representation of each digital twin in the first group of intermediate results is determined, this representation being in the form of a graph embedding, $E_u^{\square}$, generated by a trained GNN. In a step S103, a second group of digital twins in the searched dataset is identified based on the degree of similarity between their graph embeddings and the graph embeddings $E_u^{\square}$ of the digital twins in the first group of intermediate results. This second group of digital twins constitutes a second set of intermediate results. Typically the second group of digital twins comprises a plurality of digital twins but, in principle, this second group could include just a single digital twin. In step S104, search results are output based on the first and second groups of intermediate results: the manner of selecting the output search results from amongst the digital twins in the first and second groups of intermediate results may vary depending on the application.

The different steps of method 100 will now be considered in greater detail.

In the example of method 100 that is illustrated by FIG. 1, the method searches an Internet-of-Things dataset comprising details of a plurality of digital twins corresponding to respective IoT entities, so as to provide search results/recommendations of digital twins (IoT entities) in response to a query. The entities having digital twins in the IoT dataset may correspond to "things" in the IoT (e.g., specific instances of network-enabled devices, including, for instance, specific smart doorbells, smart vehicles, voice-control communication devices, etc.), as well as other real-world spaces (rooms, buildings), objects and the like in the environment of the IoT devices. The user generating the query to the search system may be a human (e.g., an engineer or application-developer), but the invention is not limited to this example and is applicable to queries generated by non-human agents, for example, bots and software applications. Moreover, the query may correspond to an explicit search request or to an input which seeks digital twins to recommend. Typically, the query is received from a remote user over a wired or wireless network connection, or from a local user using a local user interface, but the invention is not limited in regard to the manner by which the query is formulated/arrives at the search system.

The search/recommendation method 100 does not presuppose availability of information additional to the search query itself, that is, there is no assumption that the method will have access to a user profile or search history. Thus, to perform the digital-twin retrieval task, with the query as input, method 100 leverages the query's semantic information, and exploits the graph structure of the searched dataset, in the process for identifying relevant digital twins.

Typically, each digital twin in the IoT dataset is described by data in a plurality of fields, including at least one field that lists semantic information. For example, on the "Thing'in" platform, it is compulsory for each digital twin to have a designated ontology (class), and optionally there may also be information regarding the name of the entity/digital twin, a description, and associated comments. Semantic embeddings may be made of the contents of any/all such fields containing textual information characterizing the digital twin. In a first step S101 of the method 100 illustrated by FIG. 1, the target search space (in this example, an IoT dataset) is filtered based on the degree of semantic similarity between the semantic information of the digital twin (e.g., its name, etc.) and Query*, where Query* may be a pre-processed version of the input query.

The received query may be pre-processed to determine salient expression(s) therein to use for the purposes of the search process. The pre-processing may include various different operations. Thus, for example, search queries generated by a human user, especially an inexperienced user, may be expressed in sentences or phrases that include expressions that are not helpful for search purposes (e.g., stopwords such as conjunctions, definite and indefinite articles, etc.). The pre-processing may include an operation of removal of stop words, for example by exploiting a list of stopwords provided in the Natural Language Toolkit (NLTK), a Python library commonly used in the field of natural language processing. The NLTK provides easy-to-use interfaces through which more than 50 corpora and vocabulary resources (such as WordNet) may be accessed. Removal of stopwords might, for example, take an input query "I am looking for smart grow-lights" and extract as input words "smart", "grow", and "lights". Query* represents the query after such pre-processing has taken place and, thus, corresponds to the salient expression(s) in the search query.

In step S101, the semantic similarity between Query* and the textual information of digital twins in the searched dataset may be evaluated in any convenient manner. One method for quantifying the semantic similarity between two words is to generate vector representations of the compared words and to determine the degree of similarity between the generated vectors, for example by determining a distance between them (e.g., Euclidean distance), or a correlation coefficient, and so on. Increasingly, when it is desired to generate a representation of the semantic content of a word, a neural network architecture is used to generate the representation and the output representation is called a "word embedding". A well-known approach of this kind for generating vector representations of this kind is Word2Vec (developed by a team led by Tomas Mikolov, see U.S. Pat. No. 9,037,464). Such vector-based approaches may be used in embodiments of the invention.

Figure 2:
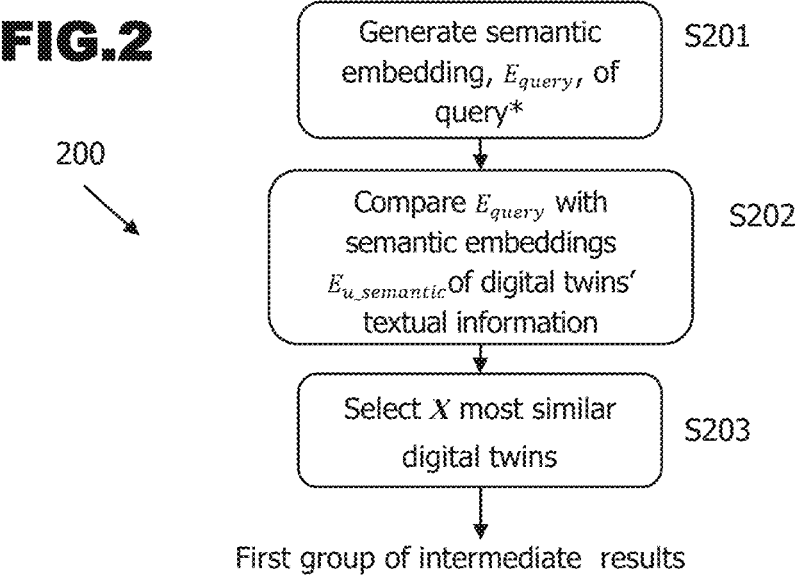
FIG. 2 is a flow diagram illustrating a computer-implemented process that may be used in the method according to FIG. 1 to filter a dataset based on semantic similarity between a search query and textual information (e.g., the names, classes, etc.) of digital twins in the searched dataset.

However, preferred implementations of the first embodiment of the invention employ the method 200 illustrated by FIG. 2 to implement step S101 of FIG. 1.

Neural network architectures can be used to generate representations of sentences/groups of words, notably to capture syntactic as well as semantic information about the word group; and in this situation the generated representation is generally called a "sentence embedding". In step S201 of method 200, a chosen sentence-embedding tool may be used to generate a semantic embedding, $E_{query}$, of the search query or, more usually, the semantic embedding $E_{query}$ of the pre-processed Query*. In step S202 of method 200, the target search space (in this example, the IoT dataset) is filtered based on the degree of similarity between the semantic embedding, $E_{query}$, of the search query and comparable semantic embeddings, $E_{u\_semantic}$, of the textual information, $text_u$, of the digital twins in the searched dataset. The semantic embeddings, $E_{u\_semantic}$, of the textual information of the digital twins in the searched dataset may be generated in a preliminary process prior to reception of any specific search, or may be generated on the fly when a search query is received. Best results are achieved in the case where the same sentence-embedding tool is used to generate the semantic embedding, $E_{query}$, of the search query and the semantic embeddings, $E_{u\_semantic}$, of the textual information of each digital twin in the searched dataset.

Various architectures have been proposed for generating semantic embeddings of word groups: for instance, Skip-Thought (Kiros et al, 2015, in "Skip-Thought Vectors", Advances in Neural Information Processing Systems 28, pages 3294-3302, ed. C. Cortes et al), InferSent (Conneau et al, 2017, in "Supervised Learning of Universal Sentence Representations from Natural Language Inference Data", Proceedings of the 2017 Conference on Empirical Methods in natural Language processing, pages 670-680), Universal Sentence Encoder (Cer et al, "Universal Sentence Encoder", arXiv:1803:11175), and others. Such architectures may be used in embodiments of the invention. However, preferred implementations of method 200 employ an SBERT neural network architecture to generate the semantic embeddings of the query and to generate the semantic embeddings of the textual information of the digital twins in the searched dataset.

The basic BERT architecture is an example of a transformer and was described by Jacob Devlin, et al, in "BERT: Pre-training of Deep Bidirectional Transformers for Language Understanding", arXiv preprint arXiv:1810.04805. In contrast to recurrent neural networks (RNNs), transformers employ attention mechanisms. BERT employs a siamese-twin neural network structure (in which the weights in parallel neural network structures are the same), having multiple layers, and it was designed to compare two sentences and yield an output indicative of the degree of similarity between them. To perform this sentence-pair regression task, a BERT network receives as input the two sentences for comparison, separated by a dedicated token [SEP], and applies multiple attention mechanisms for each neural network layer. Nils Reimers and Iryna Gurevych proposed the Sentence BERT architecture (called SBERT for short) in "Sentence-BERT: Sentence Embeddings using Siamese BERT-Networks" (arXiv:1908.10084), 2019, the entire contents of which are hereby incorporated by reference. SBERT modifies a BERT architecture so as to obtain an output which is a semantic embedding of an input word group. More particularly, SBERT starts with a trained BERT network, tunes it to a target task, and adds a pooling operation to the network's output so as to generate an output sentence embedding that has fixed size irrespective of the size of the input sentence.

In preferred embodiments of the method 200 of FIG. 2, the semantic similarity, $Sim_{semantic}$, between the semantic embedding, $E_{query}$, of the search query and the semantic embedding, $E_{u\_semantic}$, of the textual information, $text_u$, of a digital twin in the searched dataset is determined by computing the cosine similarity between $E_{query}$ (constituted by an SBERT embedding of Query*) and $E_{u\_semantic}$ (constituted by an SBERT embedding of the digital twin's textual information), as follows:

$$E_{query} = SBERT(\text{Query}) \quad (1)$$

$$E_{u\_semantic} = SBERT(\text{text}_u) \quad (2)$$

$$Sim_{semantic} = \frac{E_{query} E_{u\_semantic}}{\|E_{query}\| * \|E_{u\_semantic}\|} \quad (3)$$

The values of $Sim_{semantic}$ computed for the different digital twins in the searched dataset can be used to rank the digital twins, with those digital twins that are the most similar to the search query being assigned the highest rank. In step S203 of method 200, a given number, X, of the highest-ranked digital twins are selected as a first group of intermediate results. Typically X is a number designating a plurality of digital twins, and its value may be set according to the application.

The digital twins in the first group of intermediate results constitute the digital twins whose textual information is the most semantically-similar to the search query. In the first embodiment of the invention, these digital twins having associated textual information (class, name, etc.) that is semantically-similar to the search query are used as a springboard to identify other digital twins which are also relevant to the search query but which were not identified by the initial semantic-based search steps. More particularly, the next phase of the method 100, embodied in steps S102 and S103, makes use of a trained graph neural network to identify additional relevant digital twins by leveraging knowledge embodied in the graph of digital twins in the searched dataset. That is, the first embodiment of the invention makes use of the graph of the digital twins of the searched dataset to generate additional embeddings of the digital twins via a graph neural network and uses these additional "graph" embeddings to predict links between digital twins in the first group of intermediate results on the one hand, and other digital twins in the searched dataset on the other hand. Such other digital twins, predicted to be linked to the digital twins in the first group, constitute a second group of intermediate results and may be pertinent as results to return in response to the search query.

Based on the graph of the digital twins in the searched dataset, a graph neural network is used to generate, for each considered digital twin u, a "graph embedding" Eu which integrates not only information regarding the properties of this digital twin u but also information regarding this digital twin's neighborhood in the graph. It may be considered that there may be a link between a digital twin $u_1$ in the first group of intermediate results and another digital twin $u_2$ in the searched dataset if the graph embeddings, $Eu_1$ and $Eu_2$, of these two digital twins are similar to one another, for example, if the cosine similarity of the graph embeddings $Eu_1$ and $Eu_2$ has a high value.

It may be considered that the searched dataset defines a graph G composed of nodes (digital twins) V and edges (relationships) E. The task of identifying additional digital twins which are relevant to the search query can be considered to include a link prediction task, notably, a task of determining whether, for digital twin $u_1 \in V$ and digital twin $u_2 \in V$, where one of $u_1$ and $u_2$ is included in the first group of intermediate results, can it be considered that these two digital twins are linked.

To get the node embedding of each considered digital twin, preferred embodiments of the invention make use of a high-performance graph neural network approach called GraphSAGE (SAmple and aggreGatE) which uses an inductive learning method and can be used on large scale graphs. GraphSAGE is described in the paper "Inductive representation learning on large graphs" by WL Hamilton et al, in Proceedings of the 31st International Conference on Neural Information Processing Systems. page 1025-1035, 2017, the entire contents of which are hereby incorporated by reference.

Training of the GraphSAGE architecture focuses on using information about the targeted graph to train a set of aggregator functions rather than explicitly training a specific embedding for each node. The GraphSAGE model parameters can be learned using standard stochastic gradient descent and backpropagation techniques as described by Hamilton et al. When the GraphSAGE model parameters have been learnt (e.g., using training data from a targeted graph of digital twins), the trained model includes learned parameters of a set of K aggregator functions (denoted $AGGREGATE^{(k)}$, where k=1, ..., K) and a set of K weight matrices $W^{(k)}$, which operate to propagate information between different search depths (search depths correspond to layers of the model). The forward propagation algorithm in the trained GraphSAGE model, which generates graph embeddings for nodes, operates iteratively, repeating steps of aggregation and concatenation.

In the Orange Thing in the future platform, currently there are more than 440000 digital twins, each one having associated characteristics which may be called data-properties. This platform recognizes 585 different data-properties in total, but each digital twin typically has only a small subset of these. Digital twins are related by their inner relationships, such as, "bus" stops at "bus station", etc. So, Thing'in comprises a large graph of digital twins, and takes data-properties as their multi-hot features, and classes as their semantic information.

In certain example embodiments of the invention, in regard to processing by a GraphSAGE neural network architecture, a given digital twin is treated as a node u, and the digital twin's attributes data-properties x are taken as features of node u in form multi-hot.

For example, the overall group of digital twins may involve a number n of different data-properties, D: for instance, D={$d_1$: location, $d_2$: height, ... $d_n$: speed}, and a given digital twin u may have k data-properties $D_u$=[$d_{u1}$, $d_{u2}$, $d_{u3}$ ... $d_{uk}$], where k≤n. In such a case, the data properties of digital twin u can be represented as:

$$x_u = [i_1, i_2, ... i_t ... i_n]$$

and for all $d_t \in D$ and $t \in 1, 2, ..., n$:

$$\begin{cases} i_t = 1 & \text{if } d_t \in D_u \\ i_t = 0 & \text{if } d_t \notin D_u \end{cases}$$

In other words, each digital twin u is associated with a list/feature vector $x_u$ containing 0s at locations corresponding to data properties that are not possessed by this digital twin and is corresponding to locations of data properties that are possessed by this digital twin u.

A notable feature of graph neural networks (GNNs) is that they are trained to learn information about the structure of the graph in the region local to each node. For each node of the graph (i.e., for each digital twin), information regarding the nodes in this node's neighborhood can be integrated on the central node by a message passing method. During each message-passing iteration in the GNN, a hidden embedding $h_u^{(k)}$ corresponding to each node $u \in V$ for $k^{th}$ layer is updated according to information aggregated from the neighborhood $\mathcal{N}(u)$ of the graph local to node u. This message-passing update can be represented as follows:

$$h_u^{(0)} = x_u \quad (4)$$

$$h_u^{(k+1)} = \text{UPDATE}^k(h_u^{(k)}, \text{AGGREGATE}^{(k)}(h_v^{(k)}, v \in \mathcal{N}(u))) \quad (5)$$

where UPDATE and AGGREGATE are arbitrary differentiable functions (i.e., neural networks), with the AGGREGATE functions operating to aggregate information from node neighbours, $x_u$ represents the features of node u and is taken to represent the initial features of node in question. In the presently-proposed application of GraphSAGE in certain embodiments of the invention, the message passing update is defined as:

$$h_u^{(k+1)} = \sigma\left(W^{(k+1)} \frac{1}{n_{sample}^{(k)} + 1} \sum_{v \in \mathcal{V}(u) \cup u} h_v^{(k)} + b^{(k+1)}\right) \quad (6)$$

where "averaging" is used as the AGGREGATE function, $n_{sample}^{(k)}$ is the sample number for the $k^{th}$ layer, $W^{(k+1)} \in R^{d^{(k+1)} \times d^{(k)}}$ are trainable parameter matrices, and σ denotes an elementwise non-linearity (e.g., a tanh or ReLU function).

The bias term $b^{(k+1)} \in R^{d^{(k+1)}}$ is often omitted for notational simplicity, but the present inventors have determined that including the bias term can facilitate achievement of good performance.

The "graph embedding" $E_u$ of a digital twin u is obtained at the output from the final layer of the GraphSAGE GNN, as indicated at (7) below:

$$E_u = h_u^{(final)} \quad (7)$$

The GraphSAGE architecture samples a fixed number of neighbours for each node, to reduce the required amount of calculation and to make the model more generative when facing new nodes or a new graph.

For two digital twins $u_1$ and $u_2$, a prediction can be made as to whether or not there is a link between these two digital twins by computing the similarity between their graph embeddings, for instance, by computing according to equation (8) below the cosine similarity of the graph embeddings $E_{u1}$ and $E_{u2}$ obtained as output from the trained GNN (here, the trained GraphSAGE GNN architecture):

$$Sim_{GNN} = \frac{E_{u_1} E_{u_2}}{\|E_{u_1}\| * \|E_{u_2}\|} \quad (8)$$

In the link prediction method described above, the GNN is trained using, as the features of a given digital twin, that digital twin's data-properties. However, in most situations, complementary information regarding the digital twin, such as its name or description, is also available. Accordingly, in a preferred variant, such complementary information is added to the feature set used in the training of the GNN (and during the production phase when the trained GNN is employed). In the preferred variant, the complementary information may be included in the feature set in various ways. One approach consists in concatenating the complementary information with the data-properties of the digital twin to form an extended feature set for the digital twin.

In a preferred implementation of the variant, the digital twin's data-properties are concatenated with a semantic embedding of the digital twin's textual information to form an extended feature set, as follows:

$$x_u = \text{concatenate}([x_{u\_data-properties}, E_{u\_semantic}]) \quad (9)$$

where $E_{u\_semantic}$ is a semantic embedding of the digital twin's textual information, $\text{text}_u$, for example a semantic embedding obtained using SBERT, in which case equation (9) transforms into:

$$x_u = \text{concatenate}([x_{u\_data-properties}, SBERT(\text{text}_u)]) \quad (10)$$

Figure 3:
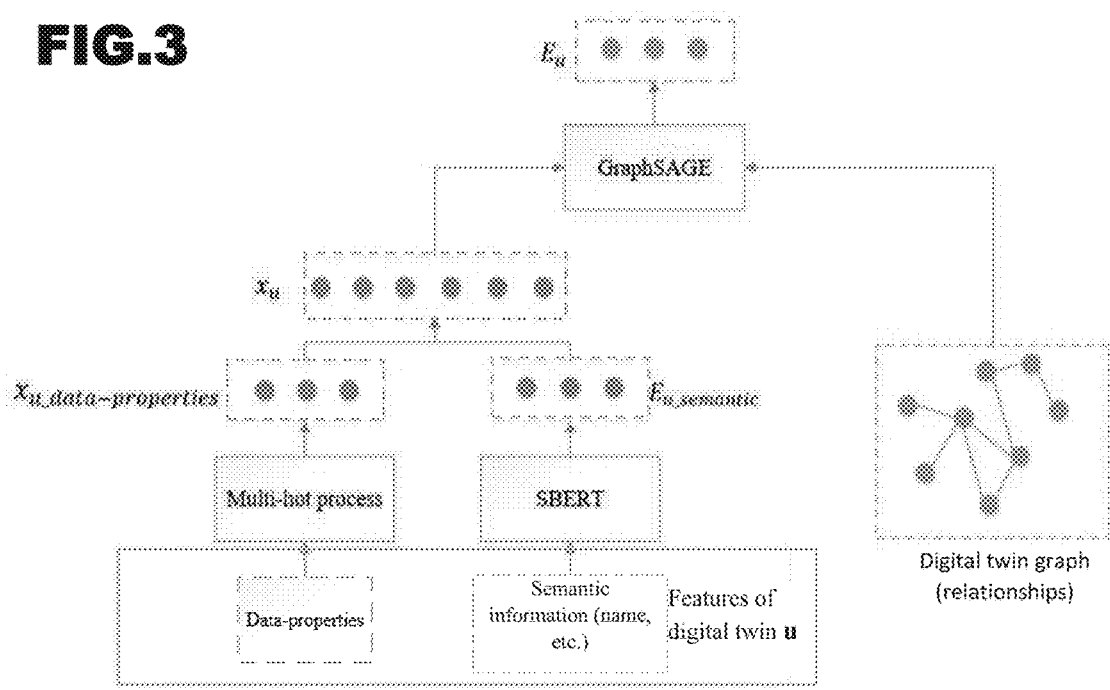
FIG. 3 is a schematic diagram illustrating use of a modified GraphSAGE neural network architecture with enhanced input feature sets.

The above-described implementation of the preferred variant may be termed "semantic GraphSAGE" and an illustration of semantic GraphSAGE is represented schematically in FIG. 3.

For two digital twins $u_1$ and $u_2$, a prediction can be made as to whether or not there is a link between these two digital twins by computing the similarity between their graph embeddings, for instance, by computing according to equation (8) above the cosine similarity of the graph embeddings $E_{u1}$ and $E_{u2}$ obtained as output from a trained semantic GraphSAGE GNN architecture. By introducing the complementary information, notably the semantic information, into the features used by the trained semantic GraphSAGE GNN architecture which generates the graph embeddings for the nodes, better performance is obtained in metrics and search results.

The final step S103 of the method 100 illustrated in FIG. 1 consists in the outputting of search results. As noted above, different approaches may be used to select digital twins from amongst those in the first and second groups of intermediate results for inclusion in the search results that are returned in response to the search query.

Figure 4:
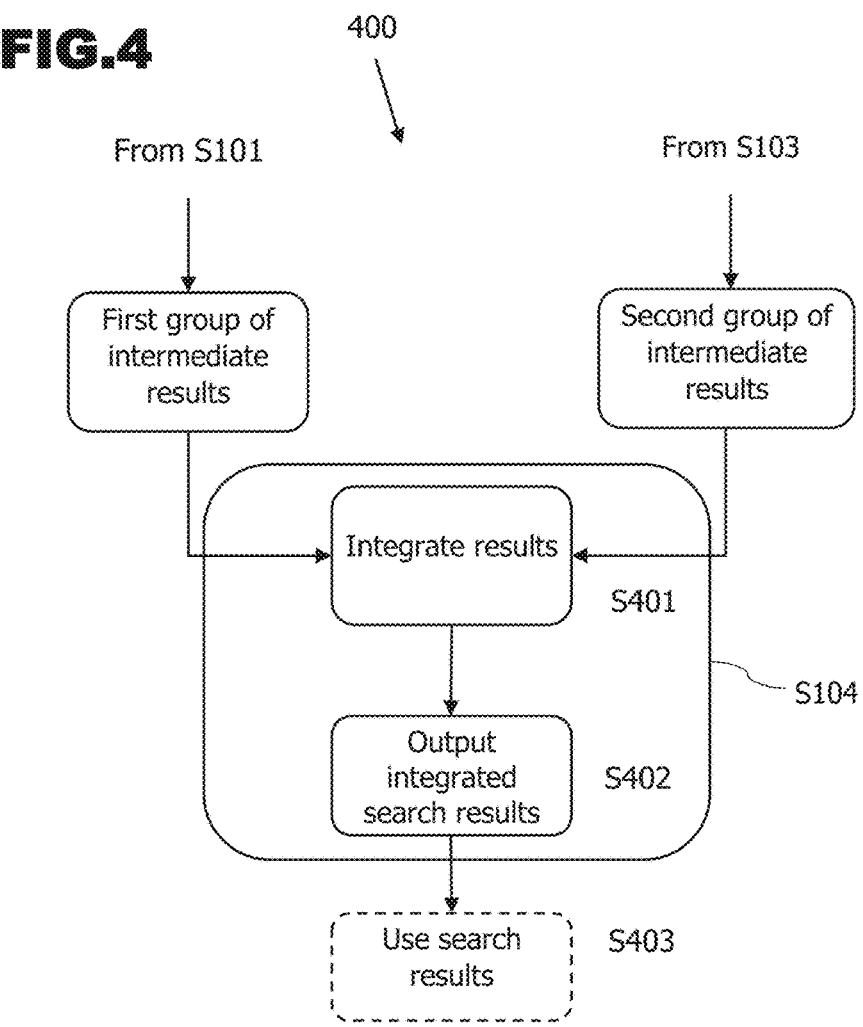
FIG. 4 is a flow diagram illustrating an example of a computer-implemented process that may be used to generate search results in the method according to FIG. 1.

FIG. 4 illustrates a preferred method of generating search results for output. According to the method 400 of FIG. 4, results from the first and second groups of intermediate results are integrated (step S401). For example, in step S401 the top X semantically-similar digital twins $R_{semantic}$ in the first group of intermediate results and, from among the digital twins of the second group of intermediate results, the top Y relevant digital twins $R_a$ for each digital twin a E $R_{semantic}$ may be combined into a final union of digital twins $R_{all}$. Typically, the digital twins included in the integrated set of results are ranked and the rank order may be used to select which digital twins to identify in the search results and/or the order in which to present the digital twins within the search results. Several integration strategies may be used to obtain the final ranks for the digital twins in $R_{all}$:

(1) Rank by Relevance Based on a User's Search History

If the users' search histories are available, for example if it is known that user u has previous query list $L_Q=[q_1, q_2, \ldots, q_t]$, then the ranking of digital twins in the output results may take the search history into account. For example, according to one approach, a weighted semantic embedding $E_h$ can be calculated for $L_Q$, and the more time that has elapsed since a previous search query was created, the smaller the weight that is applied to the words in that query. Each query's semantic embedding can be obtained using SBERT. Then a calculation can be performed to determine the semantic similarity of historical embedding $E_h$ to the digital twin's semantic embedding Eu semantic as:

$$E_{q_i} = SBERT(q_i) \quad (11)$$

$$E_h = \sum_{i=1}^{i=t} w_i E_{q_i} \quad (12)$$

$$S_{history} = \frac{E_h E_{u\_semantic}}{\|E_h\| * \|E_{u\_semantic}\|} \quad (13)$$

where $w_i$ is the weight of query $q_i$. $S_{history}$ is the final rank score.

(2) Rank by Distance

Often, users searching for digital twins on an IoT platform or the like are primarily interested in digital twins of IoT devices (or aspects of their environment) that are located in proximity to the user. So, another ranking approach consists in ranking the digital twins in $R_{all}$ based on their respective geolocation distances d to the user's position, preferably with normalization as indicated in equation (13) below:

$$S_{distance} = \frac{1/d - \min(1/d)}{\max(1/d) - \min(1/d)} \quad (13)$$

$S_{distance}$ computed for a digital twin u may then be used as the final rank score of digital twin u.

(3) Rank by Search History and Distance

Another approach may combine the two rank scores described above to get a final rank score of the digital twins in $R_{all}$. The first preliminary rank score may be the historical semantic similarity score $s_{history}$. The second preliminary rank score may be the distance score $s_{distance}$. And the final rank score of a digital twin may be calculated as:

$$s_{rank} = (1-\gamma)s_{history} + \gamma s_{distance} \quad (14)$$

where $\gamma$ is a hyper parameter and $\gamma \in [0, 1]$

If desired, in the case where the results include multiple digital twins having the same class (e.g., representing IoT devices of the same type), it may be appropriate to discard a number of these digital twins so as to reduce the number of comparable devices that are output among the search results. For example, it might be appropriate to discard all except one digital twin in a given class. This discarding of same-class digital twins may be performed at any stage in the process, e.g., by discarding certain digital twins from the first group of intermediate results and/or discarding certain digital twins from the second group of intermediate results and/or discarding some digital twins from the integrated search results. Different criteria may be used to select which of the same-class digital twins is retained. As one example, the retained digital twin(s) may be the one(s) geolocated closest to the user.

The finalized search results may be output in any desired manner, notably, these search results may be returned to a remote user by sending a message over the relevant wired or wireless connection, they may be provided to a local user by any suitable means (e.g., printing out, display on a screen), etc.

The output search results, i.e., those output in step S104 of method 100 illustrated in FIG. 1, or those output at step S402 of method 400 illustrated in FIG. 4, may be used by the originator of the search query, as indicated at S403 in FIG. 4. The nature of the use of the search results varies depending on the application targeted by the person (machine, software, etc.) that generated the search query. The scope of use cases is very large but some examples are provided below for the purposes of illustration, not limitation:

An engineer responsible for maintaining a manufacturing installation or office that is represented using digital twins on a computerized platform may delete, modify or otherwise interact with the digital twins identified among the search results.

An application developer wishing to exploit existing IoT devices, and/or the data they produce, in order to be able to implement a new technical system generates a search query to find digital twins of IoT devices having defined properties/functionality and, upon receiving search results identifying the IoT devices having the desired properties/functionality, generates or adapts an application (software code, API, etc.) to include one or more modules or functions employing the identified IoT devices and/or IoT data therefrom.

A maintenance engineer involved in an operation of repairing or managing a device generates a search query to find digital twins of comparable devices operating in a defined local geographical region and, upon obtaining search results identifying digital twins of a group of local devices, uses the results to formulate a request for data output from the identified local devices;

The search/recommendation method according to the first embodiment of the invention, illustrated by the example in FIG. 1, enables a set of numerous and varied search results to be provided in response to a user query even in a case where little data is available regarding user behavior and characteristics, thus overcoming the above-described disadvantage of search/recommendation methods based on collaborative filtering.

The search/recommendation method according to the first embodiment of the invention, illustrated by the example in FIG. 1, enables a set of numerous and varied search results to be provided in response to a user query even in a case where the expressions used in the user query are badly matched to the terminology used in the IoT dataset (e.g. because of a user's lack of experience in regard to the relevant IoT dataset), thus overcoming the above-described disadvantage of search/recommendation methods based on semantic similarity.

The search/recommendation methods according to the invention can generate search results which include not just digital twins that have semantic similarity to the search query but also digital twins that may have relevance in the graph of digital twins.

The search/recommendation methods according to certain preferred embodiments of the invention, which employ the proposed Semantic GraphSAGE architecture, can generate better graph embeddings for each digital twin and more accurately predict which digital twins are linked.

The methods described above are conveniently put into practice as computer-implemented methods. Thus, systems according to the present invention may be implemented on a general-purpose computer or device having computing capabilities, by suitable programming of the computer. In several applications the search systems according to the invention make comprise servers of IoT platforms, such as one or more servers supporting Orange's Thing'in platform.

Accordingly, the present invention provides a computer program containing instructions which, when executed on computing apparatus, cause the apparatus to perform the method steps of one or more of the methods described above.

The present invention further provides a non-transitory computer-readable medium storing instructions that, when executed by a computer, cause the computer to perform the method steps of one or more of the methods described above.

Variants

Although the present invention has been described above with reference to certain specific embodiments, it will be understood that the invention is not limited by the particularities of the specific embodiments but, to the contrary, that numerous variations, modifications and developments may be made in the above-described embodiments within the scope of the appended claims.

For example, although the specific embodiments described above relate to IoT-oriented searching, corresponding techniques may be applied to search in other domains.

Incidentally, the specific embodiments described above focus on the processing of search queries generated by a human user. However, as mentioned above, the query could be generated by a non-human agent: for example, upon detection that a trigger condition has been met.

The invention claimed is:

1. A computer-implemented method of searching for digital twins in a target dataset on a computerized platform, said target dataset comprising a graph in which the digital twins are the nodes and the relations between them are the edges, the method comprising:
   receiving a search query comprising one or more search terms;
   generating a semantic embedding of the search query;
   comparing the semantic embedding of the search query with respective semantic embeddings generated in respect of each of a plurality of digital twins on said computerized platform, to determine a first set of one or more digital twins having semantic embeddings similar to the semantic embedding of the search query;
   inputting, into a trained graph neural network, feature data of the first set of one or more digital twins and data from said graph, to generate at least one respective graph embedding in respect of the first set of digital twins, said trained graph neural network comprising a graph neural network architecture trained using training data from said graph;
   comparing the at least one graph embedding generated by the trained graph neural network in respect of the first set of digital twins with graph embeddings generated by said trained graph neural network in respect of other digital twins on said computerized platform, to determine a second set of one or more digital twins whose graph embeddings are similar to the at least one graph embedding of said first set of digital twins; and
   outputting search results comprising information identifying at least one digital twin of said second set of digital twins.

2. The computer-implemented search method according to claim 1, wherein the comparing of the semantic embedding of the search query with respective semantic embeddings generated in respect of each of a plurality of digital twins on said computerized platform comprises comparing of the semantic embedding of the search query with respective semantic embeddings of textual information characterizing the digital twins.

3. The computer-implemented search method according to claim 1, wherein the semantic embedding of the search query and the semantic embeddings for said plurality of digital twins are generated using a Sentence-Bidirectional Encoder Representations from transformers (SBERT) network.

4. The computer-implemented search method according to claim 1, wherein the graph neural network architecture is a GraphSAGE (SAmple and aggreGatE) neural network architecture.

5. The computer-implemented search method according to claim 4, wherein the GraphSAGE neural network architecture is configured to process input feature sets comprising (i) data properties of digital twins, and (ii) semantic embeddings generated for said digital twins.

6. The computer-implemented search method according to claim 5, wherein the semantic embeddings generated for the digital twins are semantic embeddings of textual information characterizing said digital twins, said semantic embeddings of textual information being generated by a Sentence-Bidirectional Encoder Representations from transformers (SBERT) network.

7. The computer-implemented search method according to claim 1, comprising assigning a rank score to digital twins in said first and second sets of digital twins, and selecting or ordering the digital twins for output based on rank score.

8. The computer-implemented search method according to claim 1, configured to search on an Internet-of-Things platform for digital twins corresponding to Internet-of-Things entities having respective assigned classes, the method further comprising:
   detecting if plural digital twins included in said first and/or second sets of digital twins correspond to Internet-of-Things entities having the same assigned classes and, upon detecting such plural digital twins, discarding at least one of said plural digital twins from the search results.

9. A search/recommendation system configured to search for digital twins in a target dataset on a computerized platform, said target dataset comprising a graph in which the digital twins are the nodes and the relations between them are the edges, said system comprising:
   a computing apparatus programmed to execute instructions to perform a method of searching for the digital twins in the target dataset, the method comprising:

receiving a search query comprising one or more search terms;

generating a semantic embedding of the search query;

comparing the semantic embedding of the search query with respective semantic embeddings generated in respect of each of a plurality of digital twins on said computerized platform, to determine a first set of one or more digital twins having semantic embeddings similar to the semantic embedding of the search query;

inputting, into a trained graph neural network, feature data of the first set of one or more digital twins and data from said graph, to generate at least one respective graph embedding in respect of the first set of digital twins, said trained graph neural network comprising a graph neural network architecture trained using training data from said graph;

comparing the at least one graph embedding generated by the trained graph neural network in respect of the first set of digital twins with graph embeddings generated by said trained graph neural network in respect of other digital twins on said computerized platform, to determine a second set of one or more digital twins whose graph embeddings are similar to the at least one graph embedding of said first set of digital twins; and outputting search results comprising information identifying at least one digital twin of said second set of digital twins.

10. A non-transitory computer-readable medium comprising instructions which, when executed by a processor of a computing apparatus, cause the processor to perform a search method for searching for digital twins in a target dataset, said target dataset comprising a graph in which the digital twins are the nodes and the relations between them are the edges, the method comprising:

receiving a search query comprising one or more search terms;

generating a semantic embedding of the search query;

comparing the semantic embedding of the search query with respective semantic embeddings generated in respect of each of a plurality of digital twins on said computerized platform, to determine a first set of one or more digital twins having semantic embeddings similar to the semantic embedding of the search query;

inputting, into a trained graph neural network, feature data of the first set of one or more digital twins and data from said graph, to generate at least one respective graph embedding in respect of the first set of digital twins, said trained graph neural network comprising a graph neural network architecture trained using training data from said graph;

comparing the at least one graph embedding generated by the trained graph neural network in respect of the first set of digital twins with graph embeddings generated by said trained graph neural network in respect of other digital twins on said computerized platform, to determine a second set of one or more digital twins whose graph embeddings are similar to the at least one graph embedding of said first set of digital twins; and outputting search results comprising information identifying at least one digital twin of said second set of digital twins.

* * * * *